(12) United States Patent
Olsson et al.

(10) Patent No.: US 12,167,497 B2
(45) Date of Patent: Dec. 10, 2024

(54) VPLMN POLICY CONTROL

(71) Applicant: Telefonaktiebolaget LM Ericsson (publ), Stockholm (SE)

(72) Inventors: Lasse Olsson, Träslövsläge (SE); Stefan Rommer, Västra Frölunda (SE); Qian Chen, Mölndal (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 386 days.

(21) Appl. No.: 17/609,664

(22) PCT Filed: May 6, 2020

(86) PCT No.: PCT/EP2020/062589
§ 371 (c)(1),
(2) Date: Nov. 8, 2021

(87) PCT Pub. No.: WO2020/225308
PCT Pub. Date: Nov. 12, 2020

(65) Prior Publication Data
US 2022/0217524 A1 Jul. 7, 2022

Related U.S. Application Data

(60) Provisional application No. 62/843,598, filed on May 6, 2019.

(51) Int. Cl.
*H04W 8/12* (2009.01)
*H04M 15/00* (2006.01)
(Continued)

(52) U.S. Cl.
CPC ............. *H04W 8/12* (2013.01); *H04M 15/66* (2013.01); *H04W 28/0268* (2013.01); *H04W 84/042* (2013.01)

(58) Field of Classification Search
CPC . H04W 8/12; H04W 28/0268; H04W 84/042; H04W 8/06; H04W 8/08; H04M 15/66; H04L 41/0893
(Continued)

(56) References Cited

U.S. PATENT DOCUMENTS

| | | | |
|---|---|---|---|
| 2013/0188527 A1* | 7/2013 | Yang | H04W 28/22 370/259 |
| 2019/0364458 A1* | 11/2019 | Zhou | H04L 47/20 |
| 2022/0210687 A1* | 6/2022 | Wu | H04W 28/0257 |

FOREIGN PATENT DOCUMENTS

| | | |
|---|---|---|
| CN | 108811000 A | 11/2018 |
| KR | 20190043084 A | 4/2019 |
| WO | 2018202094 A1 | 11/2018 |

OTHER PUBLICATIONS

Huawei, et al., "S2-185958: PCF selection during the AMF relocation," 23.502 Change Request, 3GPP TSG-SA2 Meeting #127bis, May 28-Jun. 1, 2018, Newport Beach, California, 10 pages.
(Continued)

*Primary Examiner* — Obaidul Huq
(74) *Attorney, Agent, or Firm* — Withrow & Terranova, PLLC

(57) ABSTRACT

Disclosed herein is a method performed by an AMF entity in a Visited Public Land Mobile Network, VPLMN, entity serving a roaming UE, the method comprises: obtaining, by the AMF entity, a subscribed UE-AMBR for the UE; sending, by the AMF entity, an Access Management, AM, Policy request message towards a Visited Policy Control Function, V-PCF, entity in the VPLMN to establish or update an AM Policy for the roaming UE; receiving by the AMF entity in response to sending the AM Policy request message, an AM Policy response message sent by the V-PCF entity and comprising Access and mobility related policy information that includes a serving network UE-AMBR for the UE
(Continued)

decided by the V-PCF entity; and deploying the serving network UE-AMBR instead of the subscribed UE-AMBR by sending the policy control information including the determined UE-AMBR to a RAN node in the serving network.

9 Claims, 11 Drawing Sheets

(51) Int. Cl.
*H04W 28/02* (2009.01)
*H04W 84/04* (2009.01)
(58) Field of Classification Search
USPC ........................................ 370/310, 328, 329
See application file for complete search history.

(56) References Cited

OTHER PUBLICATIONS

First Office Action for Chinese Patent Application No. 202080033695.7, mailed Jan. 12, 2024, 6 pages.
Intention to Grant for European Patent Application No. 20726001.9, mailed Apr. 12, 2022, 7 pages.
Extended European Search Report for European Patent Application No. 22183141.5, mailed Sep. 14, 2022, 8 pages.
Author Unkown, "Technical Specification Group Services and System Aspects; Policy and charging control architecture (Release 16)," Technical Specification 23.203, Version 16.0.0, 3GPP Organizational Partners, Mar. 2019, 263 pages.
Author Unkown, "Technical Specification Group Services and System Aspects; IP Multimedia Subsystem (IMS); Stage 2 (Release 16)," Technical Specification 23.228, Version 16.0.0, 3GPP Organizational Partners, Mar. 2019, 336 pages.
Author Unkown, "Technical Specification Group Services and System Aspects; Wireless and wireline convergence access support for the 5G System (5GS) (Release 16)," Technical Specification 23.316, Version 0.2.0, 3GPP Organizational Partners, Apr. 2019, 50 pages.
Author Unkown, "Technical Specification Group Services and System Aspects; System Architecture for the 5G System; Stage 2 (Release 16)," Technical Specification 23.501, Version 16.0.1, 3GPP Organizational Partners, Apr. 2019, 317 pages.
Author Unkown, "Technical Specification Group Services and System Aspects; System Architecture for the 5G System; Stage 2 (Release 16)," Technical Specification 23.501, Version 16.0.2, 3GPP Organizational Partners, Apr. 2019, 317 pages.
Author Unkown, "Technical Specification Group Services and System Aspects; Procedures for the 5G System; Stage 2 (Release 16)," Technical Specification 23.502, Version 16.0.1, 3GPP Organizational Partners, Apr. 2019, 420 pages.
Author Unkown, "Technical Specification Group Services and System Aspects; Procedures for the 5G System; Stage 2 (Release 16)," Technical Specification 23.502, Version 16.0.2, 3GPP Organizational Partners, Apr. 2019, 419 pages.
Author Unkown, "Technical Specification Group Services and System Aspects; Policy and Charging Control Framework for the 5G System; Stage 2 (Release 16)," Technical Specification 23.503, Version 16.0.0, 3GPP Organizational Partners, Mar. 2019, 84 pages.
Author Unkown, "Technical Specification Group Services and System Aspects; Security architecture and procedures for 5G System (Release 15)," Technical Specification 33.501, Version 15.4.0, 3GPP Organizational Partners, Mar. 2019, 187 pages.
Author Unkown, "Technical Specification Group Radio Access Network; NG-RAN; NG Application Protocol (NGAP) (Release 15)," Technical Specification 38.413, Version 15.3.0, 3GPP Organizational Partners, Mar. 2019, 319 pages.
Huawei, et al., "S2-185915: PCF selection during the AMF relocation," Third Generation Partnership Project (3GPP), TSG-SA2 Meeting #127bis, May 28-Jun. 1, 2018, 10 pages, Newport Beach, USA.
Nokia, et al., "S5-185384: pCR TS 32255 Clarification on Roaming flows description," Third Generation Partnership Project (3GPP), TSG SA WG3 (Telecom Management) Meeting #120, Aug. 20-24, 2018, 7 pages, Belgrade, Serbia.
International Search Report and Written Opinion for International Patent Application No. PCT/EP2020/062589, mailed Jul. 2, 2020, 10 pages.
International Preliminary Report on Patentability for International Patent Application No. PCT/EP2020/062589, mailed Jun. 24, 2021, 24 pages.
Written Decision on Registration for Korean Patent Application No. 10-2021-7039400, mailed Oct. 15, 2024, 5 pages.
Second Office Action for Chinese Patent Application No. 202080033695.7, mailed Aug. 29, 2024, 7 pages.

* cited by examiner

Reproduction of Figure 5.7.1.5-1 from 3GPP TS 23.501: The principle for classification and User Plane marking for QoS Flows and mapping to AN Resources

VPLMN POLICY CONTROL

This application is a 35 U.S.C. § 371 national phase filing of International Application No. PCT/EP2020/062589, filed May 6, 2020, which claims the benefit of U.S. Provisional Application No. 62/843,598, filed May 6, 2019, the disclosures of which are incorporated herein by reference in their entireties.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

The Fifth Generation System (5GS) introduced the separation of mobility management (User Equipment (UE) based) and session management (Protocol Data Unit (PDU) session based). Due to this, some UE based session management becomes transparent to the Access and Mobility Management Function (AMF) and enforced by the Radio Access Network (RAN).

FIG. 1

UE Aggregate Maximum Bit Rate (UE-AMBR) relates to all the Quality of Service (QoS) flows in all the Protocol Date Unit (PDU) Sessions for a UE, not only the QoS flows in one PDU session—unless the UE has only established one PDU session FIG. 1 is a schematic illustration of the principle for classification and User Plane marking for QoS Flows and mapping to AN Resources, which is reproduced from 3GPP TS 23.501.

Below are some texts in TS 23.501 related to the UE-AMBR (it is conceptually a session management control). Currently, it is only possible for the RAN to impose the enforcement of the UE-AMBR at the UE level.

---

5.6.2 Interaction between AMF and SMF

The AMF is responsible of selecting the SMF per procedures described in clause 6.3.2. For this purpose, it gets subscription data from the UDM that are defined in that clause. Furthermore, it retrieves the subscribed UE-AMBR from the UDM to send it to the (R)AN as defined in clause 5.7.2

---

5.7.1.9 AMBR/MFBR enforcement and rate limitation

The The (R)AN shall enforce UE-AMBR (see clause 5.7.2.6) in UL and DL per UE for Non-GBR QoS Flows.

---

5.7.2.6 Aggregate Bit Rates

Each PDU Session of a UE is associated with the following aggregate rate limit QoS parameter:
per Session Aggregate Maximum Bit Rate (Session-AMBR).
The subscribed Session-AMBR is a subscription parameter which is retrieved by the SMF from UDM. SMF may use the subscribed Session-AMBR or modify it based on local policy or use the authorized Session-AMBR received from PCF to get the Session-AMBR, which is signalled to the appropriate UPF entity/ies to the UE and to the (R)AN (to enable the calculation of the UE-AMBR). The Session-AMBR limits the aggregate bit rate that can be expected to be provided across all Non-GBR QoS Flows for a specific PDU Session. The Session-AMBR is measured over an AMBR averaging window which is a standardized value. The Session-AMBR is not applicable to GBR QoS Flows.
Each UE is associated with the following aggregate rate limit QoS parameter:
per UE Aggregate Maximum Bit Rate (UE-AMBR).
The UE-AMBR limits the aggregate bit rate that can be expected to be provided across all Non-GBR QoS Flows of a UE. Each (R)AN shall set its UE-AMBR to the sum of the Session-AMBR of all PDU Sessions with active user plane to this (R)AN up to the value of the subscribed UE-AMBR. The subscribed UE-AMBR is a subscription parameter which is retrieved from UDM and provided to the (R)AN by the AMF. The UE-AMBR is measured over an AMBR averaging window which is a standardized value. The UE-AMBR is not applicable to GBR QoS Flows.
NOTE: The AMBR averaging window is only applied to Session-AMBR and UE-AMBR measurement and the AMBR averaging windows for Session-AMBR and UE-AMBR are standardised to the same value.

---

SUMMARY

There currently exist certain challenge(s) in controlling a UE-AMBR in a serving network.

From the existing text in TS 23.501 above, it can be seen that the upper limit of AMBR at UE level only depends on the subscribed UE-AMBR. In case of a roaming scenario, there is no logic for Visited Public Land Mobile Network (VPLMN) to steer the policy.

In addition, in the VPLMN, the AMF has control of mobility, which is at the UE level but transparent to session related policy/control, and thus not suitable for UE level session policy control. The Visited Session Management Function (V-SMF) only sees the PDU session level and does not have the overview or the UE.

Certain aspects of the present disclosure and their embodiments may provide solutions to the aforementioned or other challenges.

Embodiments of the present disclosure provide UE level session related policy control through the Policy Control Function (PCF), which is used for access and mobility in current 5GS architecture.

In some embodiments, UE level session related policy control can be used as a trigger for the AMF to initiate communication with access and mobility PCF (i.e. amPCF). The AMF may indicate the support of UE-AMBR retrieval from the PCF either a) based on specific indication or b) by providing subscribed UE-AMBR from UDM.

In some embodiments, the amPCF can provide UE level session policy (e.g. UE-AMBR) to the AMF as part of the UE Access and Mobility policy.

In some embodiments, the amPCF supports optional UE level session policy control as part of the Access and Mobility policy, based on configuration for roaming subscriber.

In some embodiments, even for a home subscriber, the amPCF may provide more dynamic UE level session control (e.g. UE-AMBR), while the UDM may provide more static UE-AMBR control There are, proposed herein, various embodiments which address one or more of the issues disclosed herein.

Certain embodiments may provide one or more of the following technical advantage(s). Embodiments of the solution described herein provide a control logic in the serving network through access and mobility PCF for UE level session management in general, and specifically on UE-AMBR parameter control.

Another embodiment is directed to a method performed by an AMF entity in a VPLMN serving a roaming UE. The method comprises: obtaining, by the AMF entity, a subscribed UE-AMBR for the UE; sending, by the AMF entity, an AM Policy request message towards a V-PCF entity in the VPLMN to establish or update an AM Policy for the roaming UE; receiving by the AMF entity in response to sending the AM Policy request message, an AM Policy response message sent by the V-PCF entity and comprising Access and mobility related policy information that includes a serving network UE-AMBR for the UE decided by the V-PCF entity and; deploying the serving network UE AMBR instead of the subscribed UE AMBR by sending the policy control information including the serving network UE-AMBR to a RAN node in the serving VPLMN.

Another embodiment is directed to a method performed by a V-PFC entity in a VPLMN serving a roaming UE. The method comprises: receiving, by the V-PCF entity, an AM Policy request message sent by an AMF entity in the VPLMN to establish or update an AM Policy for the roaming UE, which AM Policy request message comprises at least one of: an UE-AMBR retrieval indication or the subscribed UE-AMBR; deciding, by the V PCF entity, a serving network UE-AMBR for the UE based on least one of: the UE-AMBR retrieval indication or the subscribed UE-AMBR; and sending, by the V PCF entity in response to receiving the AM Policy request message, an AM Policy response message towards the AMF entity, which AM Policy response message comprises Access and mobility related policy information that includes the serving network UE-AMBR for the UE.

Another embodiment is directed to an AMF entity configured to be operative in a VPLMN serving a roaming UE, the AMF entity comprising one or more processors (QQ204) that operate to provide functions of the AMF entity such that the AMF entity can operatively: obtain a subscribed UE-AMBR for the UE; send AM Policy request message towards a V-PCF entity in the VPLMN to establish or update an AM Policy for the roaming UE; receive in response to sending the AM Policy request message, an AM Policy response message sent by the V-PCF entity and comprising Access and mobility related policy information that includes a serving network UE-AMBR for the UE decided by the V-PCF entity; and deploy the serving network UE AMBR instead of the subscribed UE AMBR by sending policy control information including the serving network UE-AMBR to a RAN node in the serving VPLMN.

Another embodiment is directed to a V-PFC entity configured to be operative in a VPLMN serving a roaming UE, the V PCF entity comprising one or more processors that operate to provide functions of the V PCF entity such that the V-PCF entity can operatively: receive an AM Policy request message sent by an AMF entity in the VPLMN to establish or update an AM Policy for the roaming UE, which AM Policy request message comprises at least one of: an UE-AMBR retrieval indication or the subscribed UE-AMBR; decide a serving network UE-AMBR for the UE based on least one of: the UE-AMBR retrieval indication or the subscribed UE-AMBR; and send (XX104, XX204, XX306), in response to receiving the AM Policy request message, an AM Policy response message towards the AMF entity, which AM Policy response message comprises Access and mobility related policy information that includes the serving network UE-AMBR for the UE.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
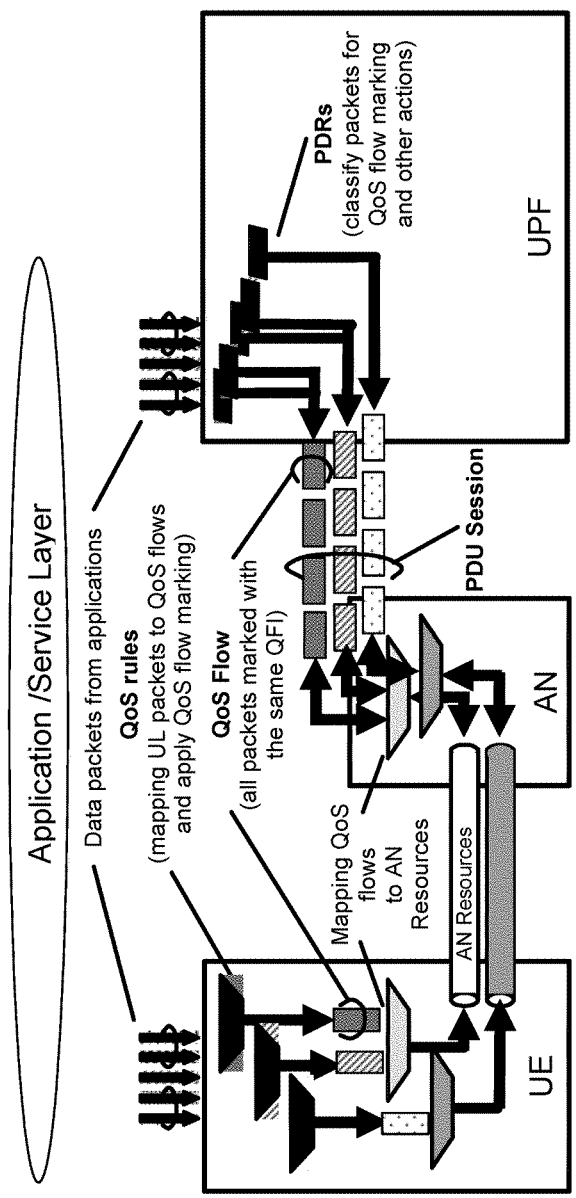
FIG. 1 is a is a schematic illustration of the principle for classification and User Plane marking for QoS Flows and mapping to AN Resources.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Additional information may also be found in the document(s) provided in the Appendix.

Radio Node: As used herein, a "radio node" is either a radio access (RAN) node or a wireless device.

Radio Access Node: As used herein, a "radio access node" or "radio network node" or RAN node is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network entity" is any type of entity in a core network. Some examples of a core network entity include, e.g., a Mobility Management Entity (MME), a Packet Data Network Gateway (P-GW), a Service Capability Exposure Function (SCEF), or the like in an Evolved Packet Core (EPC). Some other examples of a core network entity include, e.g., an Access and Mobility Management Function (AMF), a Network Slice Selection Function (NSSF), an Authentication Server Function (AUSF), a UDM, a Session Management Function (SMF), a Policy Control Function (PCF), an AF, a NEF, a User Plane Function (UPF), or the like in a 5G Core (5GC). A core network entity may be implemented as a physical network node (e.g., including hardware or a combination of hardware and software) or implemented as a functional entity (e.g., as software) that is, e.g., implemented on a physical network node or distributed across two or more physical network nodes.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

FIG. 2

Figure 2:
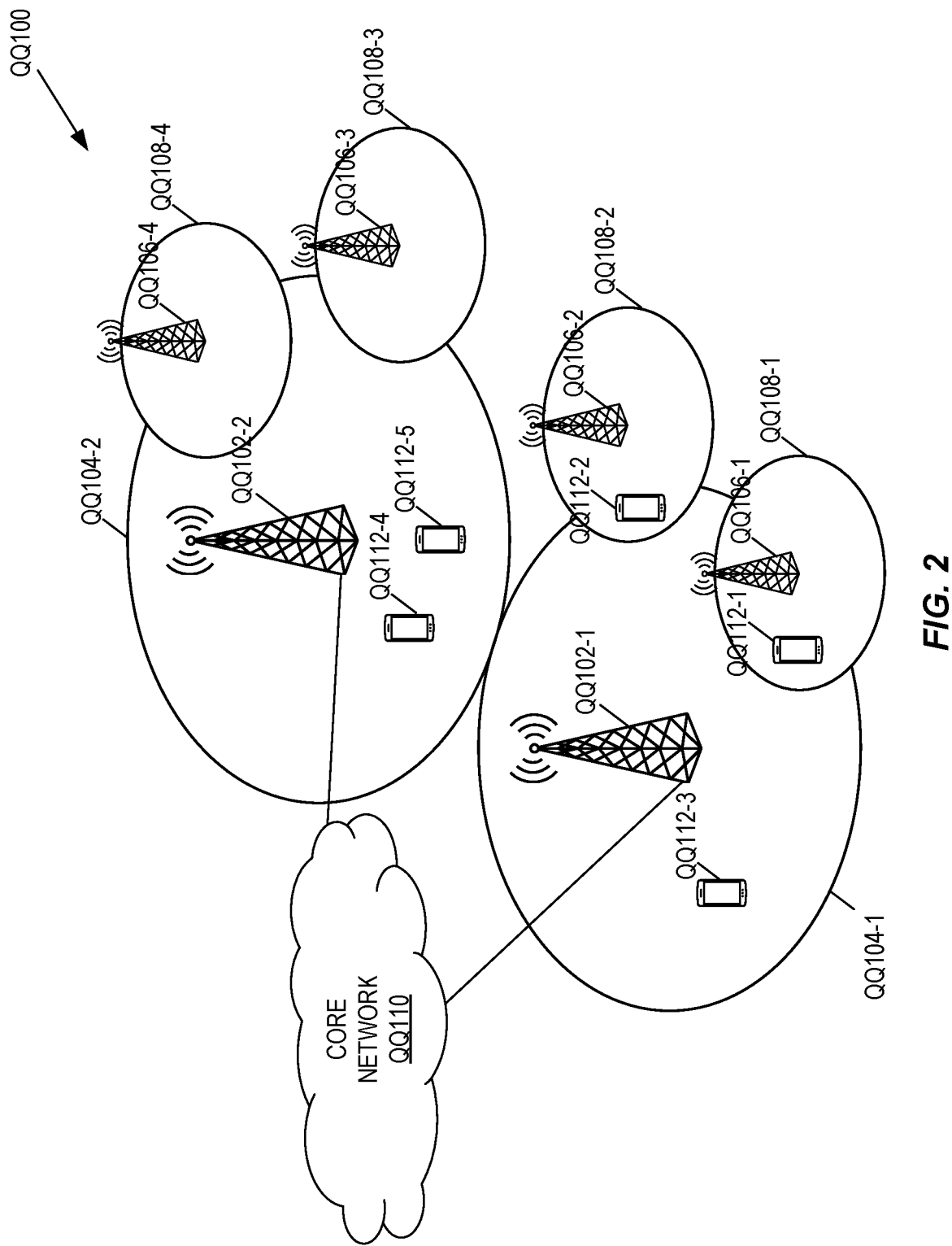
FIG. 2 illustrates one example of a cellular communications system in which embodiments of the present disclosure may be implemented.

FIG. 2 illustrates one example of a cellular communications system QQ100 in which embodiments of the present disclosure may be implemented. In the embodiments described herein, the cellular communications system QQ100 is a 5GS including a 5G NR RAN. In this example, the 5G RAN includes base stations QQ102-1 and QQ102-2, which in 5G NR are referred to as gNBs, controlling corresponding (macro) cells QQ104-1 and QQ104-2. The base stations QQ102-1 and QQ102-2 are generally referred to herein collectively as base stations QQ102 and individually as base station QQ102. Likewise, the (macro) cells QQ104-1 and QQ104-2 are generally referred to herein collectively as (macro) cells QQ104 and individually as (macro) cell QQ104. The RAN may also include a number of low power nodes QQ106-1 through QQ106-4 controlling corresponding small cells QQ108-1 through QQ108-4. The low power nodes QQ106-1 through QQ106-4 can be small base stations (such as pico or femto base stations) or Remote Radio Heads (RRHs), or the like. Notably, while not illustrated, one or more of the small cells QQ108-1 through QQ108-4 may alternatively be provided by the base stations QQ102. The low power nodes QQ106-1 through QQ106-4 are generally referred to herein collectively as low power nodes QQ106 and individually as low power node QQ106. Likewise, the small cells QQ108-1 through QQ108-4 are generally referred to herein collectively as small cells QQ108 and individually as small cell QQ108. The cellular communications system QQ100 also includes a core network QQ110 (e.g., a 5G core in the 5GS), where the base stations QQ102 (and optionally the low power nodes QQ106) are connected to the core network QQ110.

The base stations QQ102 and the low power nodes QQ106 provide service to wireless devices QQ112-1 through QQ112-5 in the corresponding cells QQ104 and QQ108. The wireless devices QQ112-1 through QQ112-5 are generally referred to herein collectively as wireless devices QQ112 and individually as wireless device QQ112. The wireless devices QQ112 are also sometimes referred to herein as UEs.

FIG. 3

Figure 3:
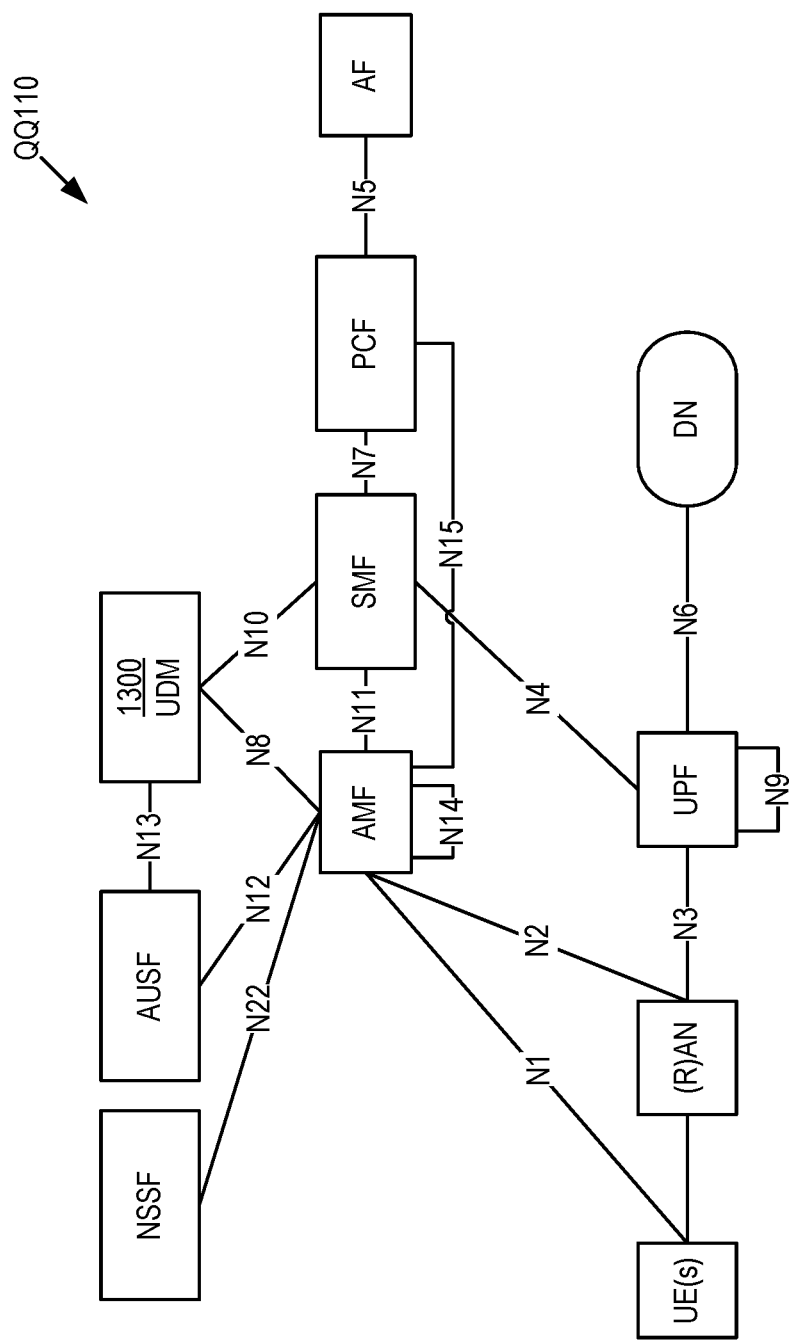
FIG. 3 illustrates a wireless communication system represented as a 5G network architecture composed of core NFs, where interaction between any two NFs is represented by a point-to-point reference point/interface.

FIG. 3 illustrates a wireless communication system represented as a 5G network architecture composed of core Network Functions (NFs), where interaction between any two NFs is represented by a point-to-point reference point/interface. FIG. 3 can be viewed as one particular implementation of the system QQ100 of FIG. 2.

Seen from the access side the 5G network architecture shown in FIG. 3 comprises a plurality of User Equipment (UEs) connected to either a Radio Access Network (RAN) or an Access Network (AN) as well as an Access and Mobility Management Function (AMF). Typically, the R(AN) comprises base stations, e.g. such as evolved Node Bs (eNBs) or 5G base stations (gNBs) or similar. Seen from the core network side, the 5G core NFs shown in FIG. 3 include a Network Slice Selection Function (NSSF), an Authentication Server Function (AUSF), a Unified Data Management (UDM), an AMF, a Session Management Function (SMF), a Policy Control Function (PCF), and an Application Function (AF).

Reference point representations of the 5G network architecture are used to develop detailed call flows in the normative standardization. The N1 reference point is defined to carry signaling between the UE and AMF. The reference points for connecting between the AN and AMF and between the AN and UPF are defined as N2 and N3, respectively. There is a reference point, N11, between the AMF and SMF, which implies that the SMF is at least partly controlled by the AMF. N4 is used by the SMF and UPF so that the UPF can be set using the control signal generated by the SMF, and the UPF can report its state to the SMF. N9 is the reference point for the connection between different UPFs, and N14 is the reference point connecting between different AMFs, respectively. N15 and N7 are defined since the PCF applies policy to the AMF and SMP, respectively. N12 is required for the AMF to perform authentication of the UE. N8 and N10 are defined because the subscription data of the UE is required for the AMF and SMF.

The 5G core network aims at separating user plane and control plane. The user plane carries user traffic while the control plane carries signaling in the network. In FIG. 3, the UPF is in the user plane and all other NFs, i.e., the AMF, SMF, PCF, AF, AUSF, and UDM, are in the control plane. Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF and SMF are independent functions in the control plane. Separated AMF and SMF allow independent evolution and scaling. Other control plane functions like the PCF and AUSF can be separated as shown in FIG. 3. Modularized function design enables the 5G core network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

FIG. 4a

Figure 4A:
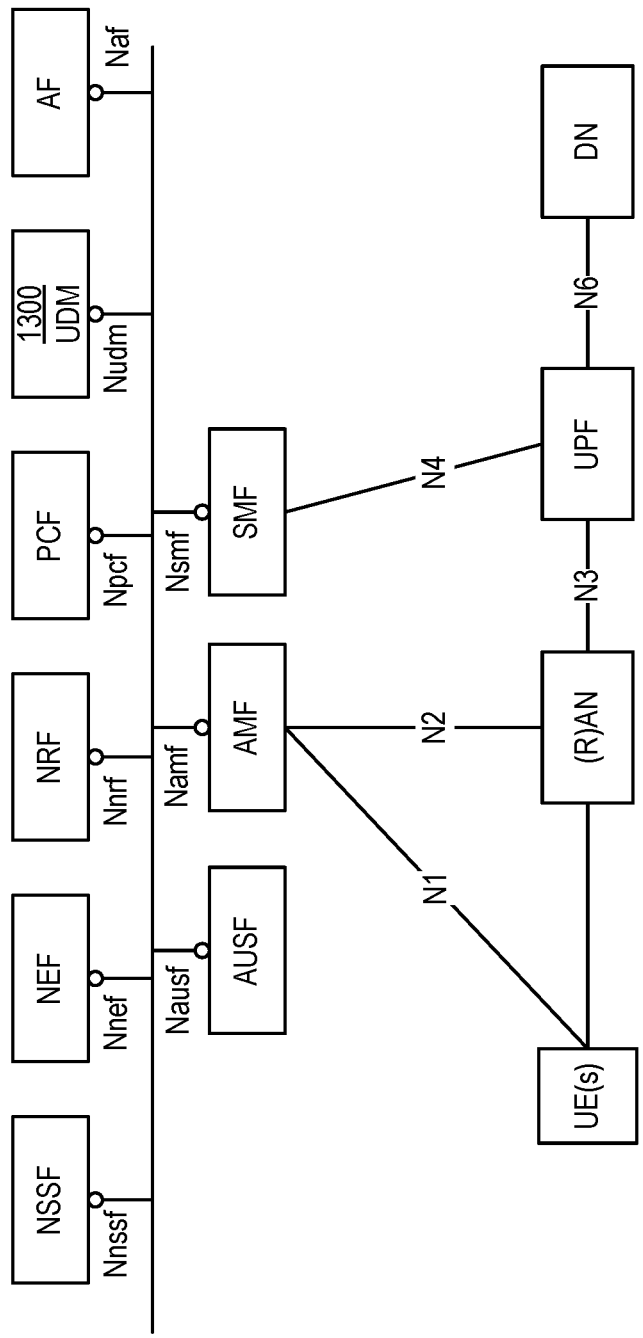
FIG. 4a illustrates a 5G network architecture using service-based interfaces between the NFs in the control plane, instead of the point-to-point reference points/interfaces used in the 5G network architecture of FIG. 3.

FIG. 4a illustrates a 5G network architecture using service-based interfaces between the NFs in the control plane, instead of the point-to-point reference points/interfaces used in the 5G network architecture of FIG. 3. However, the NFs described above with reference to FIG. 3 correspond to the NFs shown in FIG. 4. The service(s) etc. that a NF provides to other authorized NFs can be exposed to the authorized NFs through the service-based interface. In FIG. 4 the service based interfaces are indicated by the letter "N" followed by the name of the NF, e.g. Namf for the service based interface of the AMF and Nsmf for the service based interface of the SMF etc. The Network Exposure Function (NEF) and the Network Repository Function (NRF) in FIG. 4 are not shown in FIG. 3 discussed above. However, it should be clarified that all NFs depicted in FIG. 3 can interact with the NEF and the NRF of FIG. 4 as necessary, though not explicitly indicated in FIG. 3.

Some properties of the NFs shown in FIGS. 3 and 4 may be described in the following manner. The AMF provides UE-based authentication, authorization, mobility management, etc. A UE even using multiple access technologies is basically connected to a single AMF because the AMF is independent of the access technologies. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functionalities per session. The AF provides information on the packet flow to the PCF responsible for policy control in order to support Quality of Service (QoS). Based on the information, the PCF determines policies about mobility and session management to make the AMF and SMF operate properly. The AUSF supports authentication function for UEs or similar and thus stores data for authentication of UEs or similar while the UDM stores subscription data of the UE. The Data Network (DN), not part of the 5G core network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

As discussed above, currently, an upper-limit of an AMBR at the UE level is only dependent on the subscribed UE-AMBR. In case of a UE roaming, there is no logic for VPLMN to steer the policy to adjust or limit the UE-AMBR.

FIG. 4b

Figure 4B:
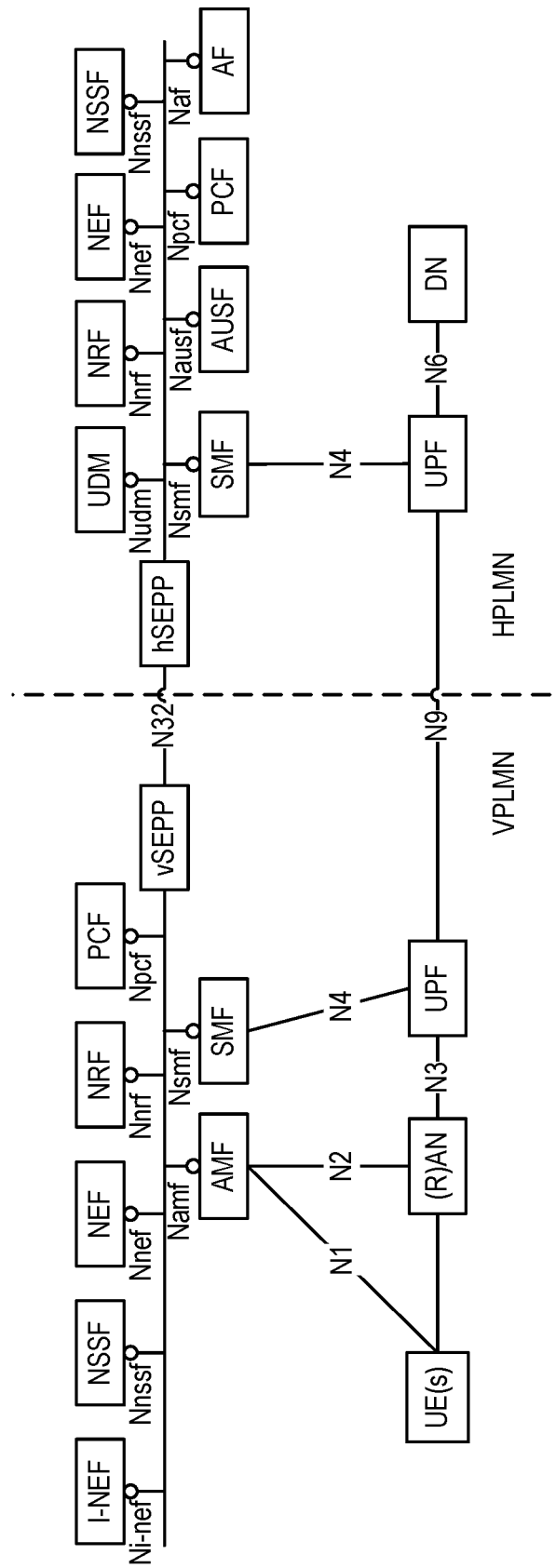
FIG. 4b illustrates a Roaming 5G network architecture in a home routed scenario in service-based interface representation.

FIG. 4b illustrates a Roaming 5G network architecture in a home routed scenario in service-based interface representation within the Control Plane. Here, the PCF in the VPLMN is a Visited PCF (V-PCF).

FIG. 5

Figure 5:
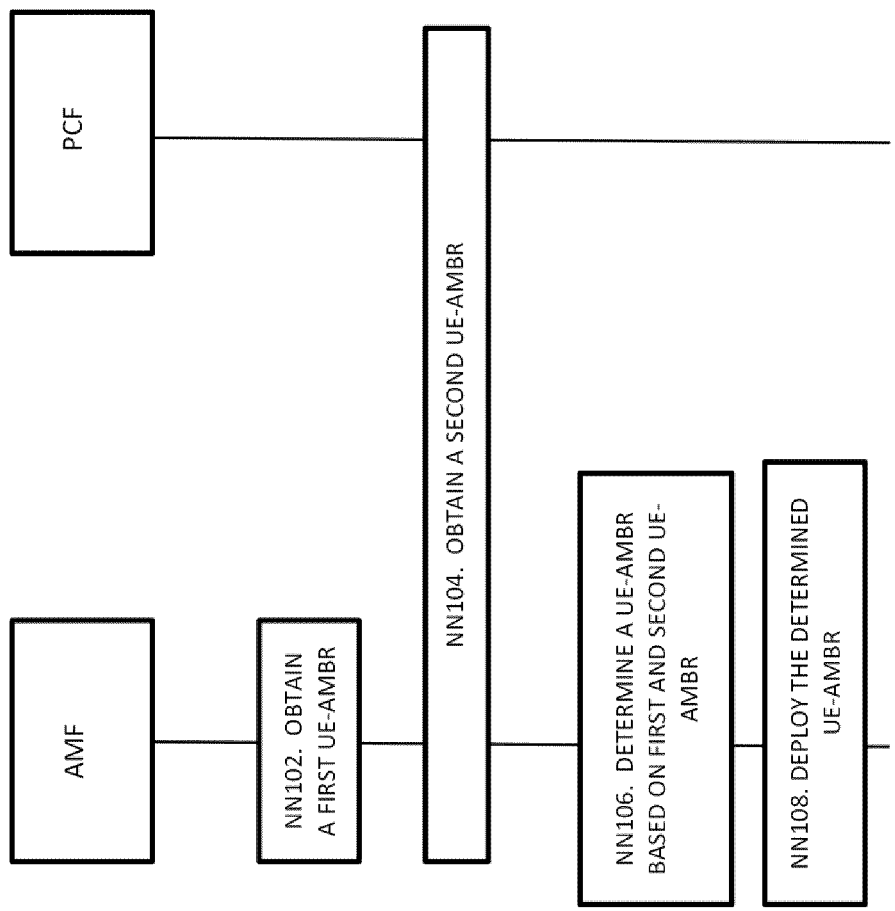
FIG. 5 illustrates an embodiment of the present disclosure.

In an embodiment illustrated in FIG. 5, a method performed by a core NF (e.g., an AMF entity) in a serving network serving a UE includes obtaining, in the core NF, a first UE-AMBR (NN102), e.g. a Subscribed UE-AMBR, obtaining a second UE-AMBR (NN104), determining a UE-AMBR for the UE in the serving network based on the first UE-AMBR and the second UE-AMBR (NN106), and deploying policy control information including the determined UE-AMBR to the serving network serving the UE (NN108).

In one embodiment, the first UE-AMBR is a subscribed UE-AMBR of the UE, which may be obtained from the UDM entity (that amongst other things stors subscription data for the UE) or from an Old AMF in case of AMF relocation, and the second UE-AMBR is a policy parameter of the serving network (e.g., obtained from a respective PCF), e.g. a policy-based serving network UE-AMBR generated by the V-PCF entity. In an embodiment, the serving network is a visited network (VPLMN). In an embodiment, deploying policy control information in step NN108 may include sending the policy control information including the determined UE-AMBR to the serving RAN (e.g., to a serving base station or serving gNB) in the serving PLMN. In an embodiment, determining the UE-AMBR for the UE in the serving network may include selecting one of the first UE-AMBR and the second UE-AMBR. In another embodiment, selecting one of the first UE-AMBR and the second UE-AMBR includes selecting the one of the first UE-AMBR and the second UE-AMBR having a smaller magnitude (i.e., selecting the smaller of the first UE-AMBR and the second UE-AMBR).

In other words, an AMF in a serving network of a UE, which may be the home network of the UE or a visited network of the UE (while UE is roaming), obtains a subscribed UE-AMBR from the UDM and obtains a policy-based UE-AMBR from the PCF in the serving network. Thus, in the roaming scenario, the VPLMN is able to steer the UE-AMBR via the policy-based UE-AMBR provided by the (V-)PCF. The AMF may determine a UE-AMBR for the UE by selecting one of the first UE-AMBR from the UDM and the second UE-AMBR from the PCF. In one example, the AMF may determine that the smaller of the first UE-AMBR and the second UE-AMBR is the UE-AMBR for the UE. For example, if the subscribed UE-AMBR in the UE home network is larger than the UE-AMBR set by the PCF in a visiting network, the AMF limits the UE-AMBR of the UE to the UE-AMBR of the visiting network.

Now, the details of some example implementations of the process of FIG. 5 will be described.

FIG. 6

Figure 6:
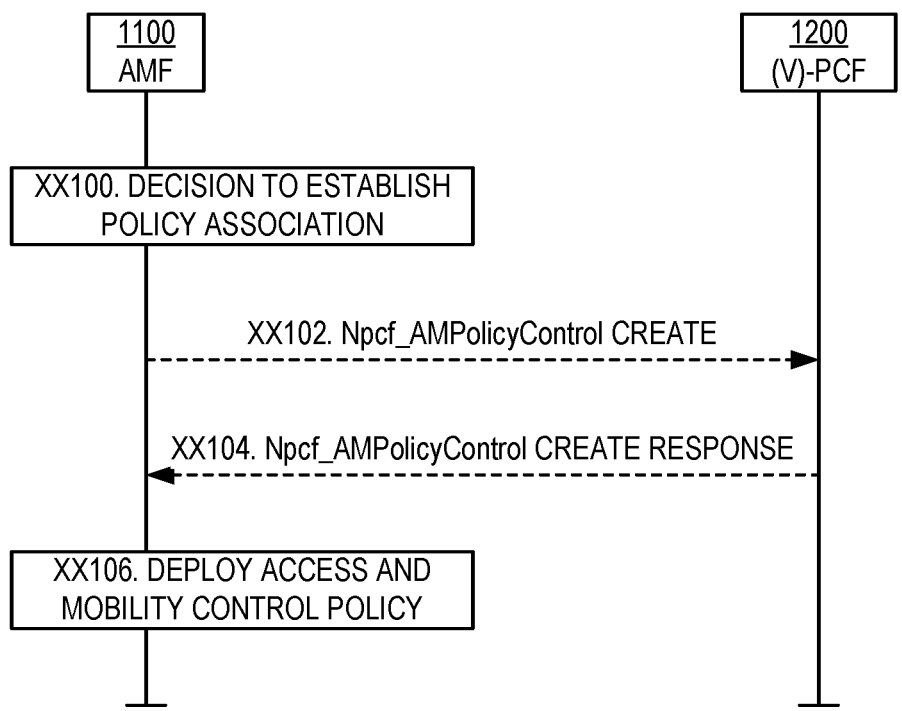
FIG. 6 illustrates an Access and Mobility (AM) policy establishment procedure in accordance with example embodiments of the present disclosure.

FIG. 6 illustrates an Access and Mobility (AM) policy establishment procedure in accordance with example embodiments of the present disclosure. As in the embodiment of FIG. 5, it is assumed that a first UE-AMBR for the UE (e.g. a Subscribed UE-AMBR) has been obtained by the AMF entity, e.g. from a UDM entity or similar or from another AMF entity (e.g. by a New AMF entity from an Old AMF entity in case of AMF relocation). There are three cases considered for AM policy association establishment, namely:

1. UE initial registration with the network.
2. The AMF entity re-allocation with PCF entity change in handover procedure and registration procedure.
3. EPS to 5GS mobility when there is no existing AM Policy Association between AMF entity and PCF entity for this UE.

In particular, FIG. 6 illustrates an AM Policy Association Establishment with new Selected PCF procedure in accordance with some embodiments of the present disclosure. This procedure concerns both roaming and non-roaming scenarios. In the non-roaming case, the role of the V-PCF entity is performed by the PCF entity. For the roaming scenarios, the V-PCF entity interacts with the AMF entity. The steps of the procedure of FIG. 6 are as follows:

Step XX100: Based on local policies, the AMF entity decides to establish AM Policy Association with the (V-)PCF entity then steps XX102 and XX104 are performed under the conditions described below.

Step XX102 [Conditional]: If the AMF entity has not yet obtained Access and Mobility policy for the UE or if the Access and Mobility policy in the AMF entity are no longer valid, the AMF requests the PCF entity to apply operator policies for the UE from the PCF entity. The AMF sends an AM Policy request message (e.g. an AM Policy Create request message such as a Npcf_AMPolicyControl_Create) towards the (V-)PCF entity to establish an AM policy control association with the (V-)PCF. The request includes at least one of the following information: SUPI, Internal Group (see clause 5.9.7 of TS 23.501 [2]), subscription notification indication and, if available, Service Area Restrictions, RFSP index, UE-AMBR retrieval indication (or alternatively subscribed UE-AMBR), the Allowed NSSAI, GPSI which are retrieved from the UDM during the update location procedure, and may include Access Type and RAT, PEI, ULI, UE time zone, and Serving Network. Note that the UE-AMBR retrieval indication (or alternatively the inclusion of the subscribed UE-AMBR in the create request) can be seen as a request for the serving network UE-AMBR (i.e., a UE-AMBR set by policy of the serving network).

Step XX104: The (V)-PCF responds to the Npcf_AM-PolicyControl_Create service operation. The (V)-PCF provides Access and mobility related policy information (e.g. Service Area Restrictions) as defined in clause 6.5 of TS 23.503 [20]. In addition, (V)-PCF can provide Policy Control Request Trigger of AM Policy Association to AMF. The AMF is implicitly subscribed in the (V-)PCF to be notified of changes in the policies. In accordance with embodiments of the present disclosure, the Access and Mobility related policy information returned to the AMF in step XX104 includes a serving network UE-AMBR for the UE (e.g. a serving network UE-AMBR generated by the (V-)PCF, e.g., a policy-based UE-AMBR preferably defined by policy of the serving PLMN.). Preferably, the serving network UE-AMBR is decided (i.e. generated) by the (V-)PCF based on at least one of: the UE-AMBR retrieval indication or the subscribed UE-AMBR provided in the request of step XX102.

Step XX106 [Conditional]: The AMF deploys the Access and mobility related policy information which includes storing the Service Area Restrictions and Policy Control Request Trigger of AM Policy Association, provisioning Service Area Restrictions to the UE and provisioning the RFSP index and Service Area Restrictions to the NG-RAN as defined in TS 23.501 [2].

Note that, in some embodiments, prior to deploying the Access and Mobility related policy information in the RAN, the AMF determines the UE-AMBR to include in this policy information based on the subscribed UE-AMBR and the serving network UE-AMBR (e.g., select the minimum of the two). This determined UE-AMBR is then the UE-AMBR that is included in the Access and Mobility related policy information that is deployed to the RAN. The RAN is then able to enforce the provided UE-AMBR, e.g., using conventional methodologies.

FIGS. 6 through 9 illustrate variations of an AM policy association modification procedure according to some embodiments of the present disclosure. In general, there are three cases considered for AM Policy Association Modification:

Case A: A Policy Control Request Trigger condition is met: the procedure is initiated by the AMF.
Case B: PCF local decision or trigger from other peers of the PCF (i.e. UDR): the procedure is initiated by the PCF.
Case C: AM Policy Association Modification with the old PCF during AMF relocation: the procedure is initiated by the AMF.

FIG. 7

Figure 7:
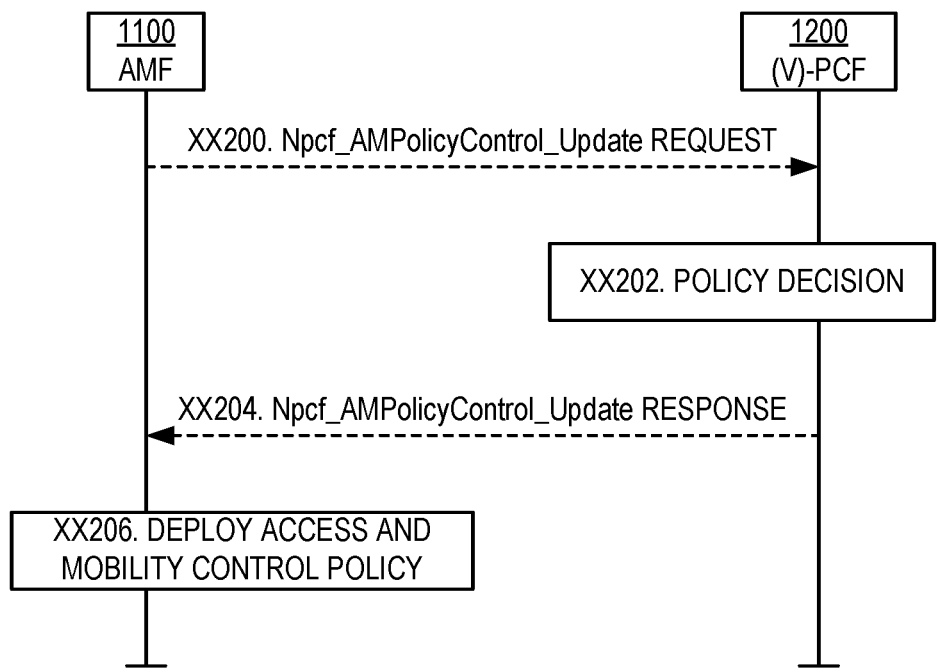
FIG. 7 illustrates an AM Policy Association Modification initiated by the AMF entity in accordance with some example embodiments of the present disclosure.

FIG. 7 illustrates an AM Policy Association Modification initiated by the AMF entity without AMF relocation in accordance with some embodiments of the present disclosure. As in the embodiment of FIG. 5, it is assumed that a first UE-AMBR for the UE (e.g. a Subscribed UE-AMBR) has been obtained by the AMF entity, e.g. from a UDM entity or similar. This procedure concerns both roaming and non-roaming scenarios. In the non-roaming case the role of the V-PCF is performed by the PCF. For the roaming scenarios, the V-PCF interacts with the AMF. The steps of FIG. 7 are as follows.

Step XX200: When a Policy Control Request Trigger condition is met, the AMF entity updates AM Policy Association and provides information on the conditions that have changed to the PCF entity by invoking Npcf_AMPolicyControl_Update. Thus, the AMF entity sends an AM Policy request message (e.g. an AM Policy Update request message such as a Npcf_AMPolicyControl_Update) to the (V-)PCF entity to update an AM policy control association with the (V-)PCF entity. The request may include at least one of the following information: SUPI, AM Policy Association ID, policy control request trigger which has been met, Subscribed Service Area Restrictions (if updated), subscribed RFSP index (if updated) which are retrieved from the UDM during the update location procedure, and may include access type and RAT, PEI, ULI, UE time zone, service network, and UE-AMBR retrieval indication (or alternatively subscribed UE-AMBR).

Step XX202: The (V-)PCF stores the information received in step XX200 and makes the policy decision.

Step XX204: The (V-)PCF responds to the AMF with the updated Access and Mobility related policy control information as defined in clause 6.5 of TS 23.503 [20] and the updated Policy Control Request Trigger parameters. In accordance with embodiments of the present disclosure, the updated Access and Mobility related policy information returned to the AMF in step XX204 includes a serving network UE-AMBR for the UE (e.g. a serving network UE-AMBR generated by the (V-)PCF, e.g., a UE-AMBR defined by policy of the serving PLMN).

Step XX206: The AMF deploys the access and mobility control policy, which includes storing the Service Area Restrictions and Policy Control Request Trigger of AM Policy Association, provisioning the Service Area Restrictions to the UE and provisioning the RFSP index, UE-AMBR and Service Area Restrictions to the NG-RAN as defined in TS 23.501 [2].

Note that, in some embodiments, prior to deploying the Access and Mobility related policy information in the RAN in step XX206, the AMF determines the UE-AMBR to include in this policy information based on the subscribed UE-AMBR and the serving network UE-AMBR (e.g., select the minimum of the two). This determined UE-AMBR is then the UE-AMBR that is included in the Access and Mobility related policy information that is deployed to the RAN. The RAN is then able to enforce the provided UE-AMBR, e.g., using conventional methodologies.

FIG. 8

Figure 8:
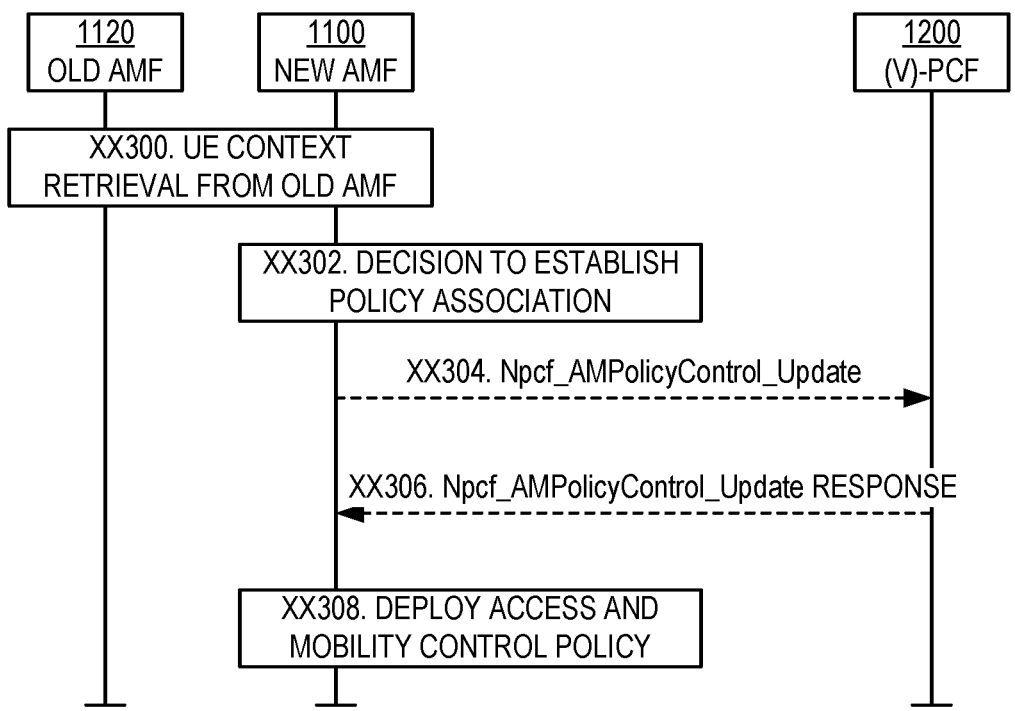
FIG. 8 illustrates an AM Policy Association Modification with old PCF during AMF relocation in accordance with some embodiments of the present disclosure.

FIG. 8 illustrates an AM Policy Association Modification with old PCF during AMF relocation in accordance with some embodiments of the present disclosure. As in the embodiment of FIG. 5, it is assumed that a first UE-AMBR for the UE (e.g. a Subscribed UE-AMBR) is obtained by the New AMF entity, e.g. from the Old AMF entity in this case of AMF relocation. This procedure is applicable to Case C. In this case, AMF relocation is performed without PCF change in handover procedure and registration procedure. This procedure concerns both roaming and non-roaming scenarios. In the non-roaming case the role of the V-PCF is performed by the PCF. For the roaming scenarios, the V-PCF entity interacts with the AMF entity. The steps of the process of Figure X3 are as follows.

Step XX300 [Conditional]: When the old AMF entity and the new AMF entity belong to the same PLMN, the old AMF transfers to the new AMF about the AM Policy Association information including policy control request trigger(s) and the PCF ID and the Subscribed UE-AMBR. For the roaming case, the new AMF receives V-PCF ID.

Step XX302: Based on local policies, the new AMF entity decides to establish UE Context with the (V-)PCF entity and contacts the (V)PCF identified by the PCF ID received in step XX300.

Step XX304: The new AMF sends an AM Policy request message (e.g. an AM Policy Update request message such as aNpcf_AMPolicyControl_Update) to the (V-)PCF to update the AM policy association with the (V-)PCF. The request may include the following information: policy control request trigger which has been met, Subscribed Service Area Restrictions (if updated), subscribed RFSP index (if updated) which are retrieved from the UDM during the update location procedure, and may include access type and RAT, PEI, ULI, UE time zone, service network. The (V-)PCF updates the stored information provided by the old AMF with the information provided by the new AMF.

Step XX306: The (V-)PCF may update the policy decision based on the information provided by the new AMF.

In accordance with embodiments of the present disclosure, the Access and Mobility related policy information returned to the new AMF in step XX306 includes a serving network UE-AMBR for the UE (e.g. a serving network UE-AMBR generated by the (V-)PCF, e.g., a UE-AMBR defined by policy of the serving PLMN.).

Step XX308: The AMF deploys the access and mobility control policy, which includes storing the Service Area Restrictions, provisioning Service Area Restrictions to the UE and provisioning the RFSP index, UE-AMBR and Service Area Restrictions to the NG-RAN.

Note that, in some embodiments, prior to deploying the Access and Mobility related policy information in the RAN in step XX308, the new AMF determines the UE-AMBR to include in this policy information based on the subscribed UE-AMBR and the serving network UE-AMBR (e.g., select the minimum of the two). This determined UE-AMBR is then the UE-AMBR that is included in the Access and Mobility related policy information that is deployed to the RAN. The RAN is then able to enforce the provided UE-AMBR, e.g., using conventional methodologies.

FIG. 9

Figure 9:
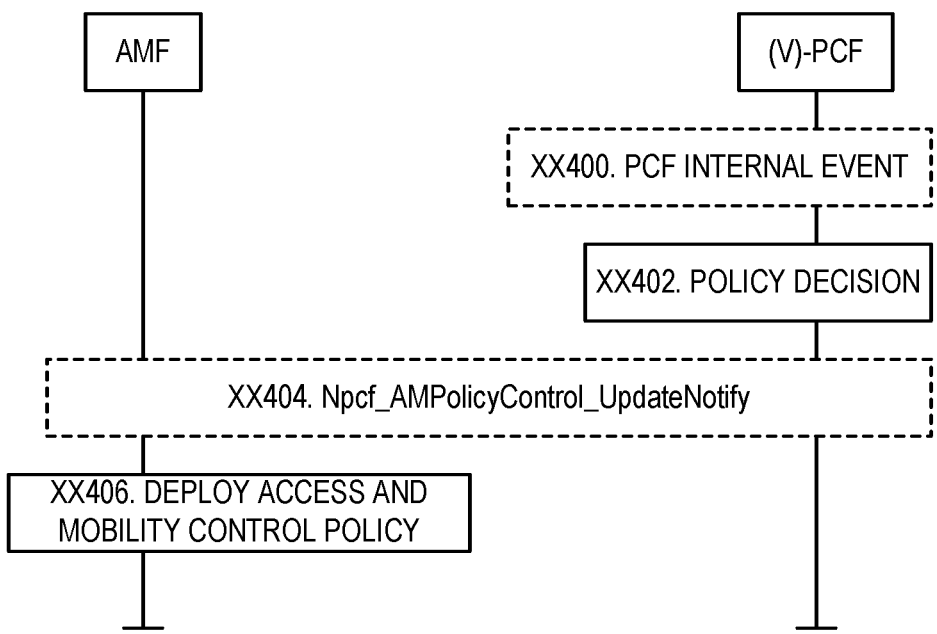
FIG. 9 illustrates procedure for an AM Policy Association Modification initiated by the PCF entity in accordance with some embodiments of the present disclosure.

FIG. 9 illustrates procedure for an AM Policy Association Modification initiated by the PCF in accordance with some embodiments of the present disclosure. This procedure is applicable to AM Policy Association modification due to Case B. This procedure concerns both roaming and non-roaming scenarios. In the non-roaming case the role of the V-PCF is performed by the PCF. For the roaming scenarios, the V-PCF interacts with the AMF. NOTE: The V-PCF stores the access and mobility control policy information provided to the AMF. The steps of the process of Figure XX4 are as follows.

Step XX400 [Conditional]: PCF determines locally that the new status of the UE context requires new policies.

Step XX402: The (V-)PCF makes a policy decision.

Step XX404: The (V-)PCF sends Npcf_UpdateNotify including SUPI, Service Area Restrictions, UE-AMBR or RFSP index.

In accordance with embodiments of the present disclosure, UE-AMBR provided to the AMF in step XX404 is the serving network UE-AMBR (i.e., a UE-AMBR defined by policy of the serving PLMN).

Step XX406: The AMF deploys the Access and mobility related policy information, which includes storing the Service Area Restrictions and Policy Control Request Trigger of AM Policy Association, provisioning of the Service Area Restrictions to the UE and provisioning the RFSP index, UE-AMBR and Service Area Restrictions to the NG-RAN.

Note that, in some embodiments, prior to deploying the Access and Mobility related policy information in the RAN in step XX406, the ne AMF determines the UE-AMBR to include in this policy information based on the subscribed UE-AMBR and the serving network UE-AMBR (e.g., select the minimum of the two). This determined UE-AMBR is then the UE-AMBR that is included in the Access and Mobility related policy information that is deployed to the RAN. The RAN is then able to enforce the provided UE-AMBR, e.g., using conventional methodologies.

Note that additional details pertaining to the example embodiments of FIGS. 6 through 9 can be found in the attached Appendix in the form of Change Requests to TS 23.501, TS 23.502, and TS 23.503.

FIG. 10

Figure 10:
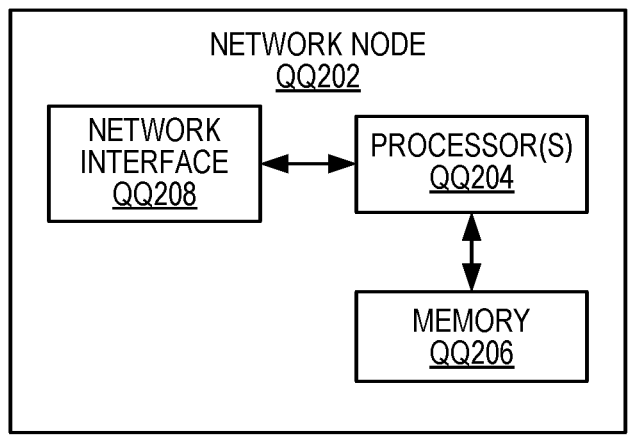
FIG. 10 is a schematic block diagram of a network node QQ200 according to some embodiments of the present disclosure.

FIG. 10 is a schematic block diagram of a network node QQ200 according to some embodiments of the present disclosure. The network node QQ200 may be, for example, a NF (e.g., AMF, PCF, V-PCF, or the like) in the core network QQ110 or a network node implementing a NF in the core network QQ110. As illustrated, the network node QQ200 includes one or more processors QQ204 (e.g., Central Processing Units (CPUs), Application Specific Integrated Circuits (ASICs), Field Programmable Gate Arrays (FPGAs), and/or the like), memory QQ206, and a network interface QQ208. The one or more processors QQ204 are also referred to herein as processing circuitry. The one or more processors QQ204 operate to provide one or more functions of a network node QQ200 (e.g., one or more functions of an AMF, PCF, or V-PCF) as described herein. In some embodiments, the function(s) are implemented in software that is stored, e.g., in the memory QQ206 and executed by the one or more processors QQ204.

FIG. 11

Figure 11:
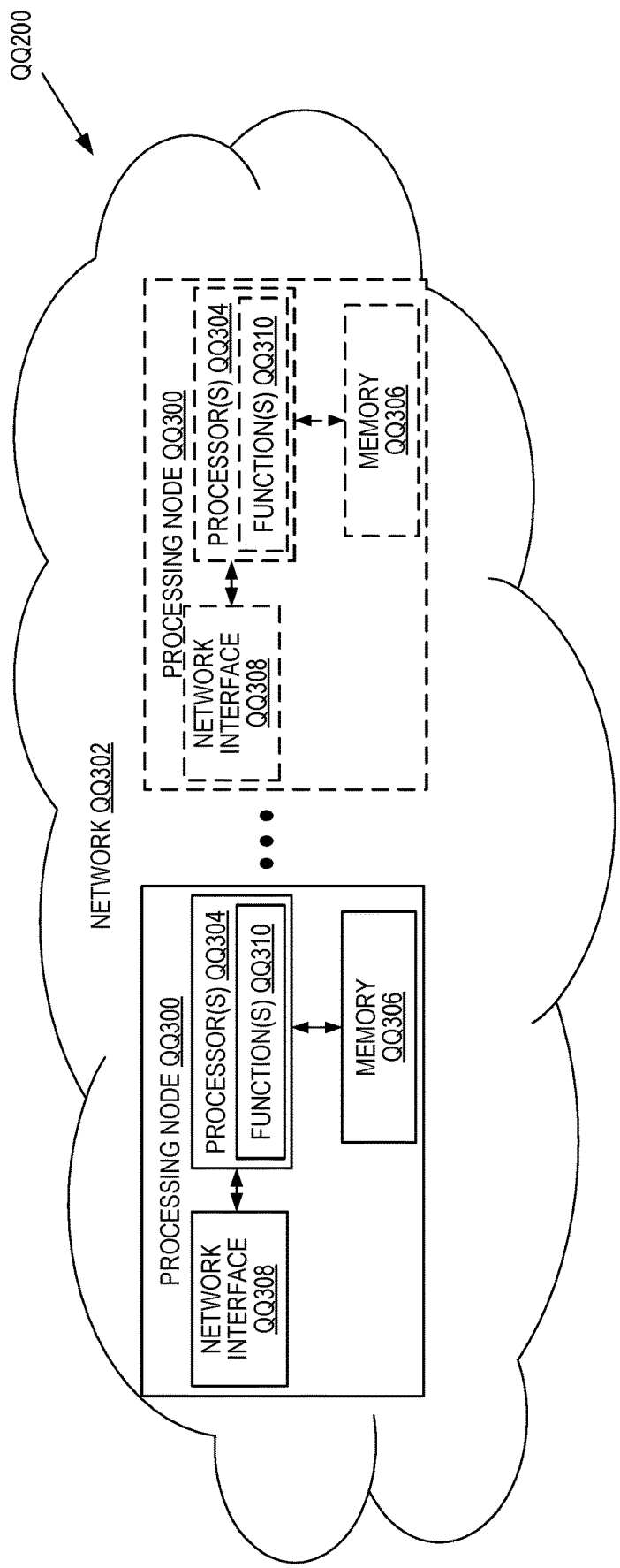
FIG. 11 a schematic block diagram that illustrates a virtualized embodiment of the network node QQ200 according to some embodiments of the present disclosure.

FIG. 11 is a schematic block diagram that illustrates a virtualized embodiment of the network node QQ200 according to some embodiments of the present disclosure. A used herein, a "virtualized" network node is an implementation of the network node QQ200 in which at least a portion of the functionality of the network node QQ200 is implemented as a virtual component(s) (e.g., via a virtual machine(s) executing on a physical processing node(s) in a network(s)). As illustrated, in this example, the network node QQ200 includes one or more processors QQ304 (e.g., CPUs, ASICs, FPGAs, and/or the like), memory QQ306, and a network interface QQ308. In this example, functions QQ310 of the network node QQ200 (e.g., one or more functions of a NF service consumer, a NF service producer, a SMF, or an H-SMF) described herein are implemented at the one or more processing nodes QQ300. In some particular embodiments, some or all of the functions QQ310 of the network node QQ200 (e.g., one or more functions of a AMF, PCF, V-PCF) described herein are implemented as virtual components executed by one or more virtual machines implemented in a virtual environment(s) hosted by the processing node(s) QQ300.

In some embodiments, a computer program including instructions which, when executed by at least one processor, causes the at least one processor to carry out the functionality of the network node QQ200 or a node (e.g., a processing node QQ300) implementing one or more of the functions QQ310 of the network node QQ200 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

FIG. 12

Figure 12:
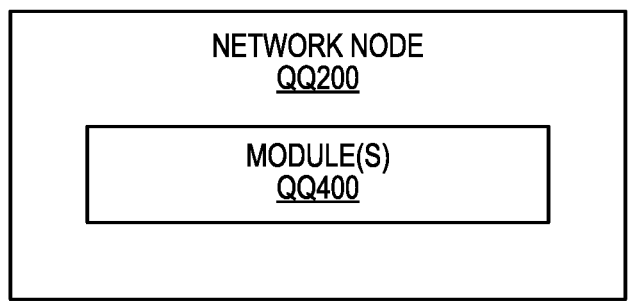
FIG. 12 is a schematic block diagram of the network node QQ200 according to some other embodiments of the present disclosure.

FIG. 12 is a schematic block diagram of the network node QQ200 according to some other embodiments of the present disclosure. The network node QQ200 includes one or more modules QQ400, each of which is implemented in software. The module(s) QQ400 provide the functionality of the network node QQ200 (e.g., one or more functions of an AMF, PCF, V-PCF) described herein. This discussion is equally applicable to the processing node QQ300 of Figure QQ3 where the modules QQ400 may be implemented at one of the processing nodes QQ300 or distributed across multiple processing nodes QQ300 and/or distributed across the processing node(s) QQ300 and the control system QQ202.

FIG. 13

Figure 13:
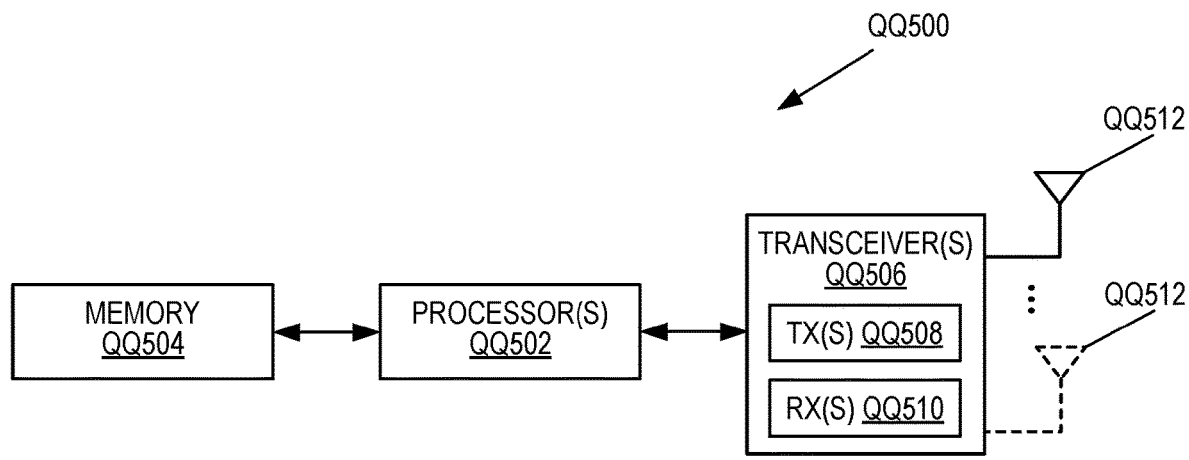
FIG. 13 is a schematic block diagram of a UE QQ500 according to some embodiments of the present disclosure.

FIG. 13 is a schematic block diagram of a UE QQ500 according to some embodiments of the present disclosure. As illustrated, the UE QQ500 includes one or more processors QQ502 (e.g., CPUs, ASICs, FPGAs, and/or the like), memory QQ504, and one or more transceivers QQ506 each including one or more transmitters QQ508 and one or more receivers QQ510 coupled to one or more antennas QQ512. The transceiver(s) QQ506 includes radio-front end circuitry connected to the antenna(s) QQ512 that is configured to condition signals communicated between the antenna(s) QQ512 and the processor(s) QQ502, as will be appreciated by on of ordinary skill in the art. The processors QQ502 are also referred to herein as processing circuitry. The transceivers QQ506 are also referred to herein as radio circuitry. In some embodiments, the functionality of the UE QQ500 described above may be fully or partially implemented in software that is, e.g., stored in the memory QQ504 and executed by the processor(s) QQ502. Note that the UE QQ500 may include additional components not illustrated in Figure QQ5 such as, e.g., one or more user interface components (e.g., an input/output interface including a display, buttons, a touch screen, a microphone, a speaker(s), and/or the like and/or any other components for allowing input of information into the UE QQ500 and/or allowing output of information from the UE QQ500), a power supply (e.g., a battery and associated power circuitry), etc.

In some embodiments, a computer program including instructions which, when executed by at least one processor, causes the at least one processor to carry out the functionality of the UE QQ500 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

FIG. 14

Figure 14:
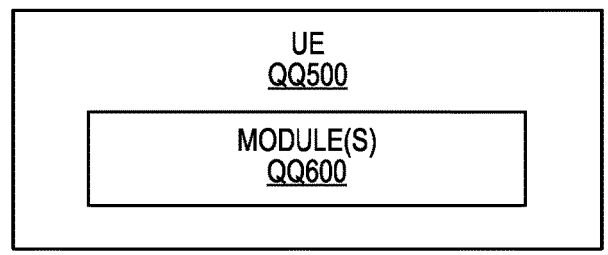
FIG. 14 is a schematic block diagram of the UE QQ500 according to some other embodiments of the present disclosure.

FIG. 14 is a schematic block diagram of the UE QQ500 according to some other embodiments of the present disclosure. The UE QQ500 includes one or more modules QQ600, each of which is implemented in software. The module(s) QQ600 provide the functionality of the UE QQ500 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.)

Some embodiments that are described above may be summarized in the following manner:
1. A method performed by a core network function (e.g., AMF) in a serving network serving a UE, comprising:
    obtaining (NN102), in the core network function, a first UE Aggregate Maximum Bit Rate, UE-AMBR;
        obtaining (NN104, XX104, XX204, XX306, XX404), in the core network function, a second UE-AMBR;
        determining (NN106, XX106, XX206, XX308, XX406) a UE-AMBR for the UE in the serving network based on the first UE-AMBR and the second UE-AMBR; and
        deploying (NN108, XX106, XX206, XX308, XX406) policy control information including the determined UE-AMBR to the serving network serving the UE.
2. The method of embodiment 1, wherein:
the first UE-AMBR being a subscribed UE-AMBR; and
the second UE-AMBR being a policy parameter of the serving network.
3. The method of embodiment 1 or 2, wherein the serving network is a visited network.
4. The method of any one of embodiments 1 to 3, wherein deploying policy control information comprises sending the policy control information including the determined UE-AMBR to a RAN node in the serving network.
5. The method of any one of embodiments 1 to 4, wherein determining the UE-AMBR for the UE in the serving network comprises selecting one of the first UE-AMBR and the second UE-AMBR.
6. The method of embodiment 5, wherein selecting one of the first UE-AMBR and the second UE-AMBR comprises selecting the one of the first UE-AMBR and the second UE-AMBR having a smaller magnitude.
7. The method of embodiment any one of embodiments 1 to 6, wherein obtaining the first UE-AMBR comprises obtaining the first UE-AMBR from the UDM.
8. The method of any one of embodiments 1 to 7, wherein obtaining the first UE-AMBR comprises obtaining the first UE-AMBR from another core network function (e.g., UDM).
9. The method of any one of embodiments 1 to 7, wherein obtaining the second UE-AMBR comprises obtaining the second UE-AMBR from a PCF.
10. The method of any one of embodiments 1 to 7, wherein obtaining the second UE-AMBR comprises obtaining the second UE-AMBR from a PCF in response to sending a message (e.g., including a request for the second UE-AMBR) to the PCF.
11. The method of embodiment 10, wherein:
the message is a request to establish an AM policy association with the PCF.
12. The method of claim 11, further comprising:
deciding, in the core network function, to establish association with the PCF.
13. The method of embodiment 10, wherein:
the message a policy update.
14. The method of claim 11, further comprising:
sending the request further comprises sending the request in response to determining a policy control request trigger condition is met.
15. The method of any one of embodiments 1 to 7, wherein obtaining the second UE-AMBR comprises obtaining the second UE-AMBR from a PCF without sending a request for the second UE-AMBR to the PCF.
16. The method of embodiment 10, wherein the request comprises an indication related to UE-AMBR retrieval.
17. The method of embodiment 16, wherein the indication is a specific indication of UE-AMBR retrieval.
18. The method of embodiment 16, wherein the indication is inclusion of the first UE-AMBR in the message.
19. A method performed by a policy control function (e.g., PCF) in a serving network serving a UE, comprising:
receiving, in the policy control function, a request from a core network function for policy control information;
deciding to send a UE Aggregate Maximum Bit Rate, UE-AMBR, to the core network function in response to receiving the request; and
sending the UE-AMBR to the core network function.
20. The method of embodiment 19, wherein the deciding to send the UE-AMBR comprises deciding to send the UE-AMBR in response to an indication of UE-AMBR support in the request.
21. A core network function adapted to perform the method of any one of embodiments 1 to 20.

Some further embodiments that are described above may be summarized in the following manner:
1. A method performed by an Access Management, AM, function entity (1100) in a Visited Public Land Mobile Network, VPLMN, serving a roaming User Equipment, UE, (112), the method comprises:
    obtaining (NN102), by the AMF entity, a subscribed UE Aggregate Maximum Bit Rate, UE-AMBR, for the UE;
    sending (XX102, XX200, XX304), by the AMF entity, an Access Management, AM, Policy request message towards a Visited Policy Control Function, V-PCF, entity (1200) in the VPLMN to establish or update an AM Policy for the roaming UE;
    receiving (XX104, XX204, XX306) by the AMF entity in response to sending the AM Policy request message, an AM Policy response message sent by the V-PCF entity, which AM Policy response message comprises Access and mobility related policy information that includes a serving network UE-AMBR for the UE decided by the V-PCF entity;
    deploying (NN108, XX106, XX206, XX308, XX406) the serving network UE-AMBR instead of the subscribed UE-AMBR by sending the policy control information including the serving network UE-AMBR to a RAN node (QQ102) in the serving VPLMN.
2. The method of embodiment 1, wherein; before sending the AM Policy request message, deciding (XX100, XX302), by the AMF entity, to establish an AM Policy Association with the V-PCF entity in the VPLMN.
3. The method of any one of embodiment 1 or 2, further comprising:
    sending the AM Policy request message in response to deciding that a policy control request trigger condition is met.
4. The method of any one of embodiments 1 to 3, wherein obtaining the subscribed UE-AMBR comprises: obtaining the subscribed UE-AMBR from a Unified Data Management, UDM, entity (1300) or from another AMF entity (1120).

5. The method of any one of embodiment 1 to 4, wherein:
   the AM Policy request message is a AM Policy Create request message (e.g. a Npcf_AMPolicyControl_Create request) to establish an AM policy association with the PCF entity, or a AM Policy Update request message (e.g. a Npcf_AMPolicyControl_Update request) to update an AM policy association with the V-PCF entity.

6. The method of any one of embodiment 1 to 5, wherein:
   the AM Policy request message comprises at least one of: an UE-AMBR retrieval indication or the subscribed UE-AMBR.

7. A method performed by a Visited Policy Control Function, V-PFC, entity in a Visited Public Land Mobile Network, VPLMN, serving a roaming User Equipment, UE, the method comprises:
   receiving (XX102, XX200, XX304), by the V-PCF entity, an Access Management, AM, Policy request message sent by an AMF entity in the VPLMN to establish or update an AM Policy for the roaming UE, which AM Policy request message comprises at least one of: an UE Aggregate Maximum Bit Rate, UE-AMBR, retrieval indication or a subscribed UE-AMBR;
   deciding (XX202, XX402), by the V-PCF entity, a serving network UE-AMBR for the UE based on least one of: the UE-AMBR retrieval indication or the subscribed UE-AMBR; and
   sending (XX104, XX204, XX306), by the V-PCF entity in response to receiving the AM Policy request message, an AM Policy response message towards the AMF entity, which AM Policy response message comprises Access and mobility related policy information that includes the serving network UE-AMBR for the UE.

8. An Access Management, AM, function entity configured to be operative in a Visited Public Land Mobile Network, VPLMN, serving a roaming User Equipment, UE, the AMF entity comprising one or more processors (QQ204) that operate to provide functions of the AMF entity such that the AMF entity can operatively:
   obtain (NN102) a subscribed UE Aggregate Maximum Bit Rate, UE-AMBR, for the UE;
   send (XX102, XX200, XX304) an Access Management, AM, Policy request message towards a Visited Policy Control Function, V-PCF, entity in the VPLMN to establish or update an AM Policy for the roaming UE;
   receive (XX104, XX204, XX306) in response to sending the AM Policy request message, an AM Policy response message sent by the V-PCF entity and comprising Access and mobility related policy information that includes a serving network UE-AMBR for the UE decided by the V-PCF entity; and
   deploy (NN108, XX106, XX206, XX308, XX406) the serving network UE-AMBR instead of the subscribed UE-AMBR by sending policy control information including the serving network UE-AMBR to a RAN node in the serving VPLMN.

9. A Visited Policy Control Function, V-PFC, entity configured to be operative in a Visited Public Land Mobile Network, VPLMN, serving a roaming User Equipment, UE, the V-PCF entity comprising one or more processors (QQ204) that operate to provide functions of the V-PCF entity such that the V-PCF entity can operatively:
   receive (XX102, XX200, XX304) an Access Management, AM, Policy request message, sent by an AMF entity in the VPLMN to establish or update an AM Policy for the roaming UE, which AM Policy request message comprises at least one of: an UE Aggregate Maximum Bit Rate, UE-AMBR, retrieval indication or a subscribed UE-AMBR;
   decide (XX202, XX402) a serving network UE-AMBR for the UE based on least one of: the UE-AMBR retrieval indication or the subscribed UE-AMBR; and
   send (XX104, XX204, XX306), in response to receiving the AM Policy request message, an AM Policy response message towards the AMF entity, which AM Policy response message comprises Access and mobility related policy information that includes the serving network UE-AMBR for the UE.

Abbreviations

At least some of the following abbreviations may be used in this disclosure. If there is an inconsistency between abbreviations, preference should be given to how it is used above. If listed multiple times below, the first listing should be preferred over any subsequent listing(s).
3G Third Generation
3GPP Third Generation Partnership Project
4G Fourth Generation
5G Fifth Generation
AF Application Function
AMF Access and Mobility Management Function
amPCF Access and Mobility Policy Control Function
AN Access Network
AUSF Authentication Server Function
BS Base Station
BSC Base Station Controller
BTS Base Transceiver Station
DL Downlink
DN Data Network
eNB Enhanced or Evolved Node B
E-UTRA Evolved Universal Terrestrial Radio Access
E-UTRAN Evolved Universal Terrestrial Radio Access Network
GERAN Global System for Mobile (GSM) Communications Enhanced Data Rates for GSM Evolution Radio Access Network
gNB New Radio Base Station
GSM Global System for Mobile Communications
HO Handover
IP Internet Protocol
LAN Local Area Network
LPP Long Term Evolution Positioning Protocol
LTE Long Term Evolution
MME Mobility Management Entity
MSC Mobile Switching Center
NEF Network Exposure Function
NF Network Function
NFV Network Function Virtualization
NR New Radio
NRF Network Repository Function
NSSF Network Slice Selection Function
OSS Operations Support System
PCF Policy Control Function
P-GW Packet Data Network Gateway
PLMN Public Land Mobile Network
QoS Quality of Service
RAN Radio Access Network RNC Radio Network Controller
SCEF Service Capability Exposure Function
SDU Service Data Unit
S-GW Serving Gateway
SIM Subscriber Identity Module
SMF Session Management Function
UDM Unified Data Management
UE User Equipment
UL Uplink
UMTS Universal Mobile Telecommunications System
USIM Universal Subscriber Identity Module
UTRA Universal Terrestrial Radio Access
UTRAN Universal Terrestrial Radio Access Network
WCDMA Wideband Code Division Multiple Access
WD Wireless Device
WLAN Wireless Local Area Network

The invention claimed is:

1. A method performed by an Access Management Function, AMF, entity in a Visited Public Land Mobile Network, VPLMN, serving a roaming User Equipment, UE, the method comprises:
obtaining, by the AMF entity, a subscribed UE Aggregate Maximum Bit Rate, UE- AMBR, for the roaming UE;
sending, by the AMF entity, an Access Management, AM, Policy request message towards a Visited Policy Control Function, V-PCF, entity in the VPLMN to establish or update an AM Policy for the roaming UE;
receiving by the AMF entity in response to sending the AM Policy request message, an AM Policy response message sent by the V-PCF entity and comprising Access and mobility related policy information that includes a serving network UE-AMBR for the roaming UE decided by the V-PCF entity; and
deploying the serving network UE-AMBR instead of the subscribed UE-AMBR by sending policy control information including the serving network UE-AMBR to a Radio Access Network, RAN, node in the serving network.

2. The method of claim 1, wherein; before sending the AM Policy request message, deciding, by the AMF entity, to establish an AM Policy Association with the V-PCF entity in the VPLMN.

3. The method of claim 1, further comprising:
sending the AM Policy request message in response to deciding that a policy control request trigger condition is met.

4. The method of claim 1, wherein obtaining the subscribed UE-AMBR comprises: obtaining the subscribed UE-AMBR from a Unified Data Management, UDM, entity or from another AMF entity.

5. The method of claim 1, wherein:
the AM Policy request message is a AM Policy Create request message to establish an AM policy association with the PCF entity, or a AM Policy Update request message to update an AM policy association with the V-PCF entity.

6. The method of claim 1, wherein:
the AM Policy request message comprises at least one of: an UE-AMBR retrieval indication or the subscribed UE-AMBR.

7. A method performed by a Visited Policy Control Function, V-PFC, entity in a Visited Public Land Mobile Network, VPLMN, serving a roaming User Equipment, UE, the method comprises:
receiving, by the V-PCF entity, an Access Management, AM, Policy request message sent by an Access Management Function, AMF, entity in the VPLMN to establish or update an AM Policy for the roaming UE, the AM Policy request message comprises at least one of:
an UE Aggregate Maximum Bit Rate, UE-AMBR, retrieval indication or a subscribed UE-AMBR;
deciding, by the V-PCF entity, a serving network UE-AMBR for the roaming UE based on at least one of: the UE-AMBR retrieval indication or the subscribed UE-AMBR; and
sending, by the V-PCF entity in response to receiving the AM Policy request message, an AM Policy response message towards the AMF entity, the AM Policy response message comprises Access and mobility related policy information that includes the serving network UE-AMBR for the roaming UE.

8. An Access Management Function, AMF, entity configured to be operative in a Visited Public Land Mobile Network, VPLMN, serving a roaming User Equipment, UE, the AMF entity comprises one or more processors that operate to provide functions of the AMF entity such that the AMF entity can operatively:
obtain a subscribed UE Aggregate Maximum Bit Rate, UE-AMBR, for the roaming UE;
send an Access Management, AM, Policy request message towards a Visited Policy Control Function, V-PCF, entity in the VPLMN to establish or update an AM Policy for the roaming UE;
receive in response to sending the AM Policy request message, an AM Policy response message sent by the V-PCF entity, the AM Policy response message comprises Access and mobility related policy information that includes a serving network UE-AMBR for the roaming UE decided by the V-PCF entity; and
deploy the serving network UE-AMBR instead of the subscribed UE-AMBR by sending policy control information including the serving network UE-AMBR to a RAN node in the serving network.

9. A Visited Policy Control Function, V-PFC, entity configured to be operative in a Visited Public Land Mobile Network, VPLMN, serving a roaming User Equipment, UE, the V-PCF entity comprises one or more processors that operate to provide functions of the V-PCF entity such that the V-PCF entity can operatively:
receive an Access Management, AM, Policy request message, sent by an Access Management Function, AMF, entity in the VPLMN to establish or update an AM Policy for the roaming UE, the AM Policy request message comprises at least one of: an UE Aggregate Maximum Bit Rate, UE-AMBR, retrieval indication or a subscribed UE-AMBR;
decide a serving network UE-AMBR for the roaming UE based on at least one of: the UE-AMBR retrieval indication or the subscribed UE-AMBR; and
send, in response to receiving the AM Policy request message, an AM Policy response message towards the AMF entity, the AM Policy response message comprises Access and mobility related policy information that includes the serving network UE-AMBR for the roaming UE.

* * * * *

UNITED STATES PATENT AND TRADEMARK OFFICE
CERTIFICATE OF CORRECTION

PATENT NO. : 12,167,497 B2
APPLICATION NO. : 17/609664
DATED : December 10, 2024
INVENTOR(S) : Olsson et al.

It is certified that error appears in the above-identified patent and that said Letters Patent is hereby corrected as shown below:

In the Specification

In Column 1, Line 62, delete "Date" and insert -- Data --, therefor.

In Column 2, Line 16, delete "5.7.1.9" and insert -- 5.7.1.8 --, therefor.

In Column 3, Line 40, delete "V-PFC" and insert -- V-PCF --, therefor.

In Column 4, Line 4, delete "V-PFC" and insert -- V-PCF --, therefor.

In Column 5, Line 20, delete "access" and insert -- access network --, therefor.

In Column 14, Line 14, delete "on" and insert -- one --, therefor.

In Column 17, Line 15, delete "V-PFC," and insert -- V-PCF, --, therefor.

In Column 17, Line 61, delete "V-PFC," and insert -- V-PCF, --, therefor.

In the Claims

In Column 19, Line 18, in Claim 1, delete "Access" and insert -- Access and Mobility --, therefor.

In Column 19, Line 62, in Claim 7, delete "V-PFC," and insert -- V-PCF, --, therefor.

In Column 20, Line 2, in Claim 7, delete "Access" and insert -- Access and Mobility --, therefor.

In Column 20, Line 20, in Claim 8, delete "Access" and insert -- Access and Mobility --, therefor.

Signed and Sealed this
Thirteenth Day of May, 2025

Coke Morgan Stewart
*Acting Director of the United States Patent and Trademark Office*

CERTIFICATE OF CORRECTION (continued)
U.S. Pat. No. 12,167,497 B2

In Column 20, Line 42, in Claim 9, delete "V-PFC," and insert -- V-PCF, --, therefor.

In Column 20, Line 49, in Claim 9, delete "Access" and insert -- Access and Mobility --, therefor.